(12) United States Patent
Brungardt et al.

(10) Patent No.: US 8,928,864 B2
(45) Date of Patent: Jan. 6, 2015

(54) PORTABLE HAND HELD TANK GAUGE

(76) Inventors: Kevin Brungardt, Gorham, KS (US);
Leon Brungardt, Walker, KS (US)

( * ) Notice: Subject to any disclaimer, the term of this patent is extended or adjusted under 35 U.S.C. 154(b) by 274 days.

(21) Appl. No.: 13/361,149

(22) Filed: Jan. 30, 2012

(65) Prior Publication Data

US 2012/0194378 A1 Aug. 2, 2012

Related U.S. Application Data

(60) Provisional application No. 61/438,026, filed on Jan. 31, 2011.

(51) Int. Cl.
| | |
|---|---|
| *G01S 15/88* | (2006.01) |
| *G01F 23/284* | (2006.01) |
| *G01S 13/86* | (2006.01) |
| *G01S 13/88* | (2006.01) |
| *G01S 15/02* | (2006.01) |
| *G01S 19/14* | (2010.01) |
| *G01F 23/292* | (2006.01) |
| *G01F 23/296* | (2006.01) |
| *G01S 17/02* | (2006.01) |

(52) U.S. Cl.
CPC .............. *G01S 15/88* (2013.01); *G01F 23/284* (2013.01); *G01S 13/86* (2013.01); *G01S 13/88* (2013.01); *G01S 15/025* (2013.01); *G01S 19/14* (2013.01); *G01F 23/2928* (2013.01); *G01F 23/2962* (2013.01); *G01S 17/023* (2013.01)
USPC ....................................................... 356/5.01

(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| 6,040,897 | A | * | 3/2000 | Clifford et al. .............. 356/4.01 |
| 8,024,151 | B2 | * | 9/2011 | Van Toorenburg et al. ... 702/150 |
| 8,159,660 | B2 | * | 4/2012 | Mimeault et al. .......... 356/139.1 |
| 2010/0277108 | A1 | * | 11/2010 | McDonnell .................... 315/360 |
| 2012/0195055 | A1 | * | 8/2012 | Prichard et al. .............. 362/401 |

FOREIGN PATENT DOCUMENTS

WO    WO2009/121181    * 10/2009 .............. G01S 17/10

* cited by examiner

*Primary Examiner* — Luke Ratcliffe
(74) *Attorney, Agent, or Firm* — Hovey Williams LLP

(57) ABSTRACT

A portable hand held tank gauge for measuring a level or a volume of a fluid in a tank comprises a housing, a signal transceiver, a measurement activator, an adjustable arm, a processing element, and a display. The housing may house a portion of the other components. The signal transceiver may transmit a signal to the surface of the fluid, receive the signal reflected from the surface, and generate an output based on the difference in time between transmitting the signal and receiving the signal. The measurement activator may selectively initiate the signal transceiver to transmit the signal. The adjustable arm may couple to the housing and position the signal transceiver independently from the housing. The processing element may calculate the level or the volume of the fluid based on the output from the signal transceiver. The display may display the level or the volume of the fluid.

18 Claims, 3 Drawing Sheets

US 8,928,864 B2

PORTABLE HAND HELD TANK GAUGE

RELATED APPLICATION

This patent application claims priority benefit, with regard to all common subject matter, of earlier-filed U.S. Provisional Patent Application No. 61/438,026, filed Jan. 31, 2011, and entitled "PORTABLE HAND HELD TANK GAUGE." The identified earlier-filed provisional patent application is hereby incorporated by reference in its entirety into the present application.

BACKGROUND

1. Field

Embodiments of the present invention relate to measurement devices. More particularly, embodiments of the present invention relate to portable devices for measuring the level or volume of fluid within a tank.

2. Related Art

Measuring the level of fluid in a tank may help a company keep track of its inventory, such as a petroleum company tracking its supply of oil. Typically, measurements of the fluid level must be performed manually by inserting a mechanical or electrical device, such as an elongated measuring probe, within the tank to determine a level of fluid within the tank. Because the tanks are very large, such measuring devices utilizing probes are cumbersome to use. Removal of the probe often results in oil or other fluids in the tank being transported with the user of the probe (e.g., on the user's clothing or person). Additionally, these measuring devices are usually permanently installed on the tank.

A company may store or transport its inventory in a variety of sizes and types of tanks. For example, a company may own above-ground tanks, in-ground tanks, tanker trucks, and the like. In addition, the tanks may be located in different areas. Therefore, differently-sized mechanical tools and electrical measuring devices may be needed for differently-sized tanks.

SUMMARY

Embodiments of the present invention solve the above-mentioned problems and provide a distinct advance in the art of measurement devices. More particularly, embodiments of the invention provide portable devices for measuring the level or volume of fluid within a tank.

A first embodiment of the invention provides a portable hand held tank gauge for measuring a level or a volume of a fluid in a tank. The gauge comprises a housing, a signal transceiver, an adjustable arm, and a processing element. The housing may house at least a portion of the other components. The signal transceiver may transmit a signal to the surface of the fluid, receive the signal reflected from the surface and generate an output based on the difference in time between transmitting the signal and receiving the signal. The adjustable arm may couple to the housing and position the signal transceiver independently from the housing. The processing element may calculate the level or the volume of the fluid based on the output from the signal transceiver.

A second embodiment of the invention provides a portable hand held tank gauge for measuring a level or a volume of a fluid in a tank. The gauge comprises a housing, a signal transceiver, an adjustable arm, and a processing element. The housing may house at least a portion of the other components. The signal transceiver may transmit a signal to the surface of the fluid, receive the signal reflected from the surface and generate an output based on the difference in time between transmitting the signal and receiving the signal. The adjustable arm may couple to the housing and position the signal transceiver independently from the housing. The adjustable arm may include a flexible shaft with a plurality of links, wherein each link is operable to pivot with respect to its adjacent links. The shaft may include a proximal end coupled to the housing and a distal end to retain the signal transceiver. The processing element may calculate the level or the volume of the fluid based on the output from the signal transceiver.

A third embodiment of the invention provides a portable hand held tank gauge for measuring a level or a volume of a fluid in a tank. The gauge comprises a housing, a signal transceiver, an adjustable arm, and a processing element. The housing may house at least a portion of the other components. The signal transceiver may transmit a signal to the surface of the fluid, receive the signal reflected from the surface and generate an output based on the difference in time between transmitting the signal and receiving the signal. The adjustable arm may couple to the housing and position the signal transceiver independently from the housing. The adjustable arm may include a first segment coupled to the housing, a second segment with an internal telescoping third segment to retain the signal transceiver, and a hinge coupled to the first segment and the second segment. The hinge may allow the second segment to rotate with respect to the first segment. The processing element may calculate the level or the volume of the fluid based on the output from the signal transceiver.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

DESCRIPTION OF THE DRAWING FIGURES

Embodiments of the present invention are described in detail below with reference to the attached drawing figures, wherein.

Figure 1:
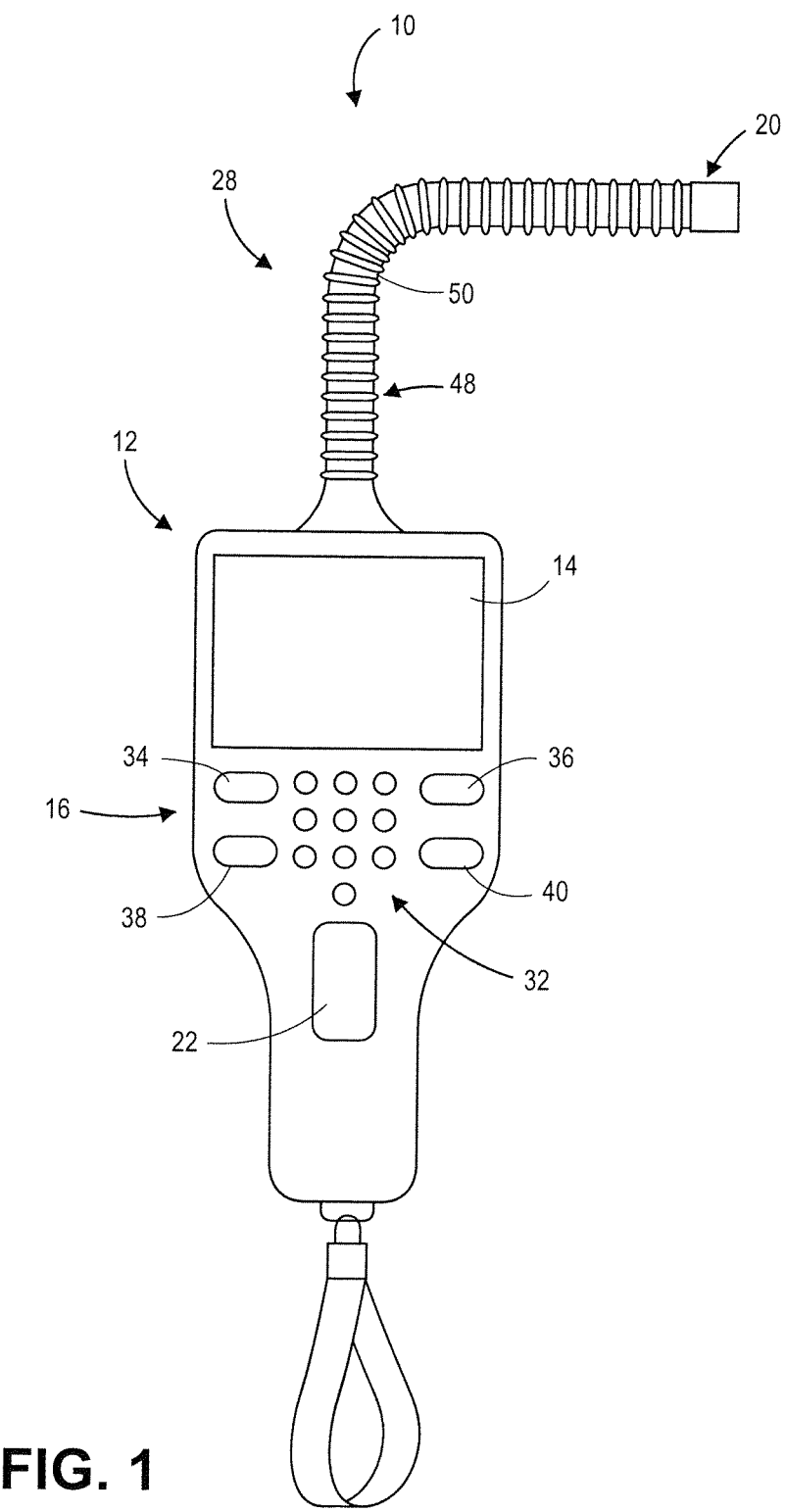
FIG. 1 is a front view of a portable hand held tank gauge, as constructed in accordance with a first embodiment of the present invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 2:
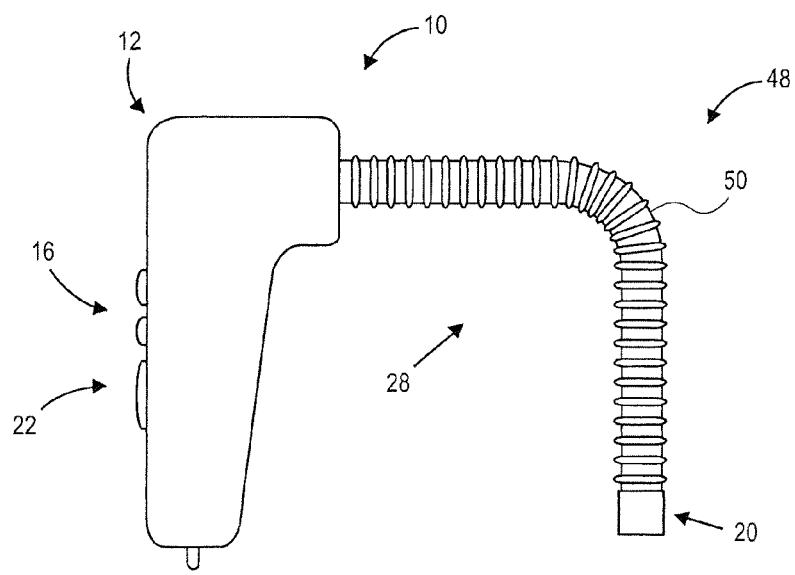
FIG. 2 is a side view of a second embodiment of the gauge.
Figure 3:
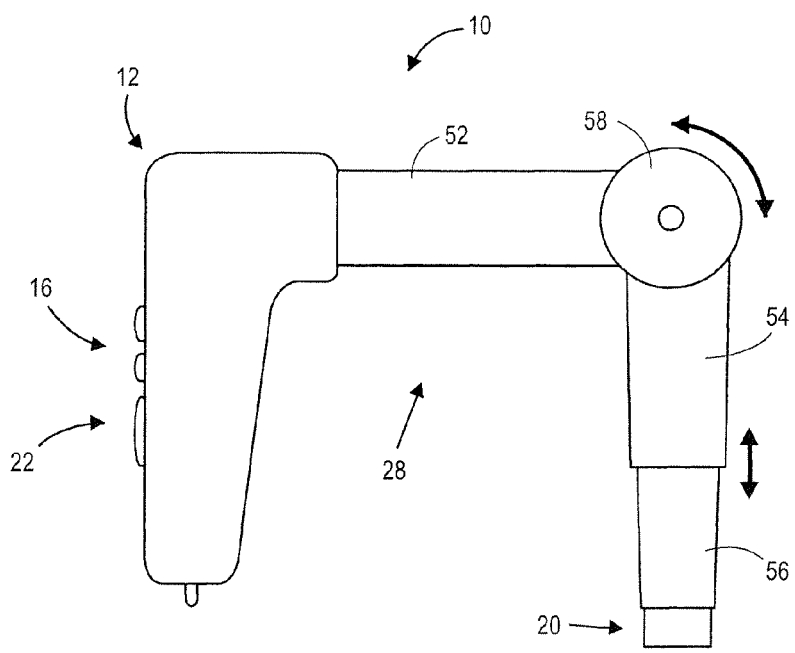
FIG. 3 is a side view of a third embodiment of the gauge.

A portable hand held tank gauge 10 for accurately measuring a level of liquid or fluid in a large tank, as constructed in accordance with various embodiments of the present invention, is shown in FIGS. 1-3. The gauge 10 may be used to measure the level and/or determine the volume of liquid in storage tanks, such as transport tanks, stock tanks, chemical tanks, barrels, or the like in environments such as oil fields, refinement or processing centers, distribution centers, and the like. The gauge 10 may broadly comprise a housing 12, a display 14, a user interface 16, a communications port 18, a signal transceiver 20, a measurement activator 22, a processing element 24, a memory element 26, and an adjustable arm 28. The gauge 10 may further include a global positioning system (GPS) element 30. Various embodiments may also include a ground clamp or other anti-static switch for ensuring static charging does not adversely affect the gauge 10 as well as a lanyard for locating and positioning the gauge 10 on a user's body.

The housing 12 generally retains the other components of the gauge 10 and may have a generally elongated and rectangular box-like shape. The housing 12 may be contoured with a wider portion to retain the display 14 and at least a portion of the user interface 16 and a narrower portion to easily fit into the user's hand. The housing 12 may have dimensions of approximately 2 inches to approximately 10 inches in width, approximately 2 inches to approximately 15 inches in length, and approximately 1 inch to approximately 10 inches in depth. The housing 12 may be formed from rigid plastic such as acrylonitrile butadiene styrene (ABS) or a similar durable material. The housing 12 may include a plurality of openings in which some of the other components of the gauge 10 are positioned.

The display 14 generally presents information and data to the user either in the form of graphics, text, or a combination of both. The display 14 may be of a variety of types, including, but not limited to, plasma, light-emitting diode (LED), organic LED (OLED), LEP (Light Emitting Polymer) or PLED (Polymer LED), liquid crystal display (LCD), thin film transistor (TFT) LCD, LED side-lit or back-lit LCD, combinations thereof, and the like. The display 14 may possess a square or a rectangular aspect ratio and may be viewed in either a landscape or a portrait mode. The display 14 may be positioned in the wider portion of the housing 12.

The user interface 16 generally allows the user to control the operation of the gauge 10. The user interface 16 may generally include knobs, dials, switches, pushbuttons, keyboards, or the like, as well as combinations thereof. In various embodiments, the user interface 16 may include a keypad 32, a first input 34, a second input 36, a third input 38, and a fourth input 40. The keypad 32 and the inputs 34, 36, 38, 40 may be positioned in the wider portion of the housing 12 and may be implemented as pushbuttons. The keypad 32 may include at least ten separate keys corresponding to the digits 0 through 9. The keypad 32 may be used to enter the dimensions or other numeric information about the tank. The first input 34 may select the units of measurement that are associated with the fluid level measurement. For example, the fluid level may be reported in a height, such as feet and inches, a volume, such as gallons or barrels, or other units. The first input 34 may be triggered repeatedly to cycle through the choices. The second input 36 may retrieve an identification (ID) number or a name of the tank to be measured. The third input 38 may retrieve other information regarding the tank to be measured, such as the size of the tank, the geographical location of the tank, historical information, prior fluid level measurements, or the like. The fourth input 40 may store information, such as the fluid level measurement as well as tank location information. The information to be retrieved by the second input 36 and the third input 38 may be retrieved from a data structure, such as a database, that is stored in the memory element 26 or that is accessible through the communications port 18. The information to be stored by the fourth input 40 may be stored in the data structure either in the memory element 26 or one accessible through the communications port 18. In addition, all of the information may be displayed on the display 14 for the user to view.

In some embodiments, the user interface 16 may be integrated with the display 14 to form a touchscreen in which the user may select the keypad 32 and the inputs 34, 36, 38, 40 by touching portions of the display 14.

The communications port 18 generally allows the gauge 10 to communicate with external devices, systems, computers, or networks. The communications port 18 may have a wired connection, such as with electrically conductive cables or optical fibers, or wireless, such as with radio frequency (RF) transmitters and receivers utilizing wireless communication protocols like Bluetooth®, WiFi, WiMAX, etc. Use of the communications port 18 allows information and data stored on the memory element 26 to be upload or otherwise transmitted to said external devices, systems, computers, or networks. Moreover, use of the communications port 18 allows software updates to be downloaded to the gauge 10 for implementation of code segments of a computer program associated with or stored in on the memory element 26 of the gauge 10.

The signal transceiver 20 generally transmits a signal to be reflected from the liquid inside of a tank and receives the reflected signal. In alternative embodiments, the signal transceiver 20 is a sensor for determining or otherwise sensing the fluid level in the tank. In even further alternatives, the signal transceiver 20 is used alone or in combination with a sensor.

The signal transmitted from the signal transceiver 20 may be audible, ultrasonic, RF, visible light, infrared, or the like. The signal may be a pulse or a series of pulses with a pattern. The signal transceiver 20 may include transmitting devices (TX) 42 such as speakers, antennas, light emitting diodes (LEDs), lasers, or the like, as well as combinations thereof. The signal transceiver 20 may include receiving devices (RX) 44 such as microphones, antennas, light detectors, laser detectors, or the like, as well as combinations thereof. An exemplary transmitting device 42 may include a laser to transmit a signal, and an exemplary receiving device 44 may include a laser detector to receive the signal. Other sensing mechanisms may also be employed, either alone or in combination, including an optical or ultrasonic transceiver. The signal transceiver 20 may also include clocks, counters, and timers or combinations thereof.

In some embodiments, the signal transceiver 20 may report to the processing element 24 the time that the signal was transmitted and the time that the signal was received. The time of flight of the signal can then be calculated (by the processing element 24) as the receive time minus the transmit time. In other embodiments, the signal transceiver 20 may perform the time of flight calculation and report it to the processing element 24. In even further embodiments, sensors and/or signal transceivers 20 that do not employ time of flight calculations may be used for sensing the fluid level, and such sensed fluid level may be stored in the memory element 26 of the gauge 10.

The measurement activator 22 generally activates the signal transceiver 20 to send a signal and receive the reflected signal or to otherwise sense the fluid level. The measurement activator 22 may include switches, pushbuttons, or other components that can be mechanically actuated. The measurement activator 22 may generate an electronic command, such as an electronic pulse or a change in a voltage or current level, when the user mechanically actuates the measurement activator 22 by flipping, pushing, or pressing the measurement activator 22. The electronic command generated by the measurement activator 22 may be communicated to the processing element 24, which in turn communicates the command to the signal transceiver 20, or the command may be directly communicated to the signal transceiver 20.

The processing element 24 generally executes a computer program, which is also commonly known as instructions, commands, software code, executables, applications, apps, and the like. The processing element 24 may include processors, microprocessors, microcontrollers, field-programmable gate arrays (FPGAs), or the like, as well as combinations thereof. The processing element 24 may be held within the housing. The computer program may include instructions that direct the processing element 24 to perform the functions of the gauge 10 described herein. For example, the processing element 24 may perform calculations on data received from the signal transceiver in order to compute the level or volume of the fluid in the tank.

The memory element 26 generally stores the computer program as well as data, such as text, databases, graphics, or the like, as well as combinations thereof. The memory element 26 may also be known as a "computer-readable storage medium" and may include non-transitory components such as random access memory (RAM), read only memory (ROM), flash drive memory, hard disk drives, or the like, as well as combinations thereof. The memory element 26 may be held within the housing 12 and may be in electronic communication with the processing element 24, such that the processing element 24 may access the computer program and data in the memory element 26 in a manner known in the art. In some embodiments, a portion or all of the computer program may be stored externally to the gauge 10, but may be accessible to the processing element 24 through the communications port 18.

Figure 4:
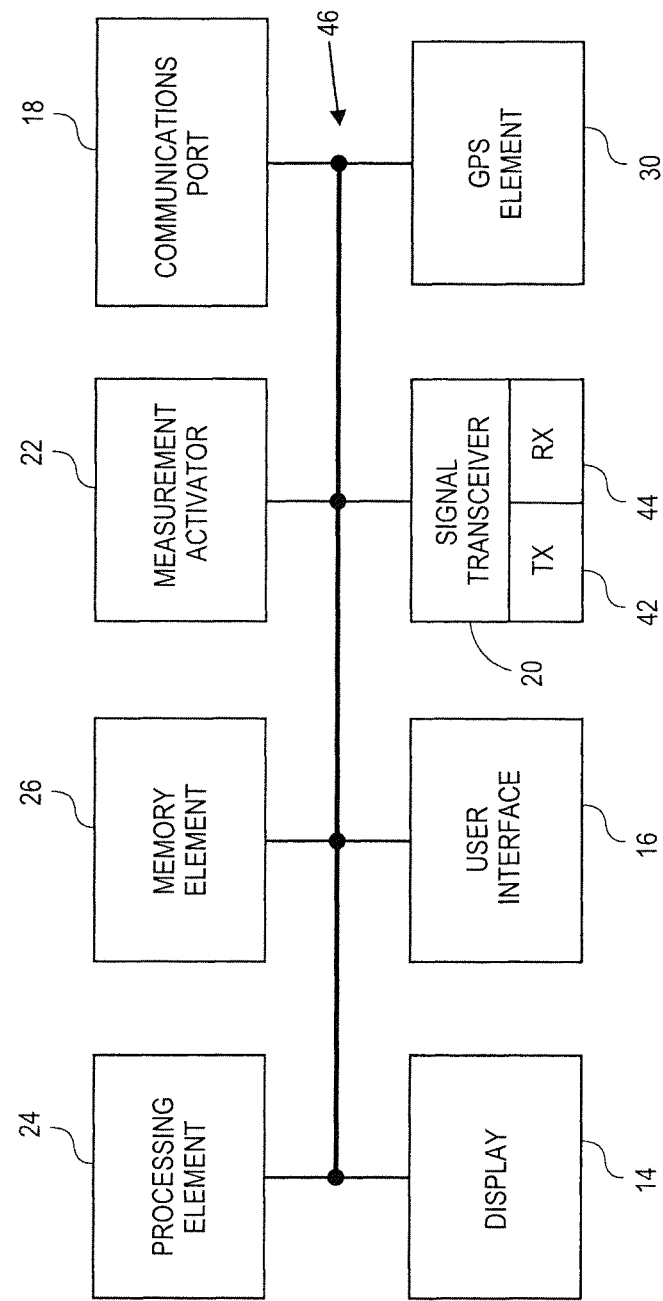
FIG. 4 is a schematic block diagram of various components of the gauge.

The measurement activator 22, the communications port 18, the signal transceiver 20, the user interface 16, and the display 14 may all be in electronic communication with the processing element 24 and/or the memory element 26, as shown in FIG. 4. The communication may be established through one or more communication busses 46. The busses 46 may be serial or parallel, unidirectional or bidirectional, or combinations thereof. The busses 46 may transmit data, commands, or combinations thereof.

The adjustable arm 28 generally positions or orients the signal transceiver 20 with respect to the housing 12. A first embodiment and a second embodiment of the adjustable arm 28 may include a flexible tubular shaft 48 with a proximal end coupled to the housing 12 and a distal end that retains the signal transceiver 20. In the first embodiment, the proximal end of the shaft 48 may be coupled to a top side of the housing 12, as shown in FIG. 1. In the second embodiment, the proximal end of the shaft 48 may be coupled to a back side of the housing 12, as shown in FIG. 2. The shaft 48 may include a plurality of links 50 positioned adjacent one another along the length of the shaft 48. Each link 50 may pivot with respect to its adjacent links 50, thereby allowing the signal transceiver 20 to be oriented at a range of angles from approximately 0 degrees to approximately 180 degrees with respect to the longitudinal axis of the housing 12. Thus, the portion of the adjustable arm 28 retaining the signal transceiver 20 may be oriented approximately parallel to the housing 12, approximately at a right angle to the housing 12, or angles therebetween. The user may position or orient the signal transceiver 20 by bending or flexing the shaft 48. With this setup, the user can hold the gauge 10 such that the display 14 is easily readable while the adjustable arm 28 and the signal transceiver 20 are inserted into a tank to measure the level or volume of the fluid therein. Generally, the signal transceiver 20 is oriented in a vertically downward direction to perform the measurement. The adjustable arm 28 allows such an orientation. Furthermore, the shaft 48 allows the adjustable arm 28 to be oriented in any direction around the housing 12, such as toward the left side, the right side, or the top side.

A third embodiment of the adjustable arm 28 may include a plurality of rigid segments coupled to one another, as shown in FIG. 3. A first segment 52 may couple to the housing 12 and may be tubular with a circular, rectangular, or square cross-sectional shape. A second segment 54 may include an inner third segment 56 that telescopically extends from and retracts into the second segment 54. The third segment 56 may include a distal end, away from the second segment 54, that retains the signal transceiver 20. The second segment 54 may couple to the first segment 52 through a hinge 58 that allows the second segment 54 to rotate with respect to the first segment 52, thereby permitting the second segment 54, the third segment 56, and the signal transceiver 20 to be oriented approximately parallel to the housing 12, approximately at a right angle to the housing 12, or angles therebetween. Thus, during usage of the gauge 10, the second segment 54 may be rotated outwardly from the housing 12 to approximately 90 degrees, and the third segment 56 may be extended from the second segment 54. In a similar fashion to the first and second embodiments, with the third embodiment of the adjustable arm 28, the user can hold the gauge 10 such that the display 14 is easily readable while the adjustable arm 28 and the signal transceiver 20 are inserted into a tank to measure the volume of the fluid therein. When the gauge 10 is not in usage, the third segment 56 may be retracted while the second segment 54 is rotated inwardly to make the gauge 10 more compact.

The GPS element 30 generally reports the global position of the GPS element 30. The GPS element 30 may include antennas and receivers as are known in the art, and the GPS element 30 may function as is known in the art. The GPS element 30 may be located in the housing 12 or within close proximity to the gauge 10. The GPS element 30 may communicate its global position to the processing element 24 and/or the memory element 26 via the communication busses 46. During usage, the gauge 10 may store the location of a tank with the output of the GPS element 30 while the fluid level of the tank is being measured.

Electric power may be supplied to the gauge 10 by one or more battery cells stored within the housing 12. In some embodiments, the battery cell may be rechargeable and the gauge 10 may include an adapter or connector to connect the battery cell to a charger. In alternative embodiments, the gauge 10 may include solar cells or hand crank generators instead of or in addition to the battery cell.

The gauge 10 may operate as follows. The user may hold the narrow portion of the housing 12 in his hand. The user may actuate the first input 34, such as by pressing a pushbutton associated with the first input 34, to set the appropriate units of measurement for the fluid level of the tank. The user may actuate the second input 36 to retrieve an ID number or name of the tank to be measured. The user may actuate the third input 38 to retrieve other information, such as the size of the tank. In various embodiments, the user may use the keypad 32 to enter dimensions and/or the volume of the tank. Some or all of the information retrieved may be displayed on the display 14.

The user may adjust the adjustable arm 28 to position the signal transceiver 20 at approximately a right angle to the longitudinal axis of the housing 12. With the first and second embodiments of the adjustable arm 28, the user may bend or flex the shaft 48. With the third embodiment of the adjustable arm 28, the user may rotate the second segment 54 away from the housing 12 and may extend the third segment 56. The user may position or place the distal end of the adjustable arm 28 in the opening of the tank such that the signal transceiver 20 is pointing generally in the vertical direction at the surface of the fluid inside the tank. The user may actuate the measurement activator 22. The transmitting device 42 may transmit a signal in the direction of the surface of the fluid. The receiving device 44 may receive the signal after the signal has reflected off the surface of the fluid and back to the signal transceiver 20. The signal transceiver 20 may report the transmit time and the receive time or the time of flight of the signal to the processing element 24.

The processing element 24 may calculate the time of flight of the signal, if it is not provided by the signal transceiver 20. Given the time of flight, the processing element 24 can calculate the distance traveled by the signal. If the transmitted and received signal is a laser pulse, then the rate of speed for the signal is the speed of light. The distance traveled by the signal may be calculated as the rate of speed of the signal multiplied by the time of flight. The distance from the signal transceiver 20 to the surface of the fluid is half the distance traveled by the signal. The user may have also retrieved the size and/or dimensions of the tank. Given the height of the tank, the processing element 24 may calculate the level of the fluid as the height minus the distance from the signal transceiver 20 to the surface of the fluid. Given the volume of the tank, the processing element 24 may calculate the volume of the fluid as the volume of the tank multiplied by the factor of the level of the fluid divided by the height of the tank. The calculated level of the fluid and/or the volume of the fluid may be displayed on the display 14. If desired, the user may actuate the first input 34 to change the units of measurement shown on the display 14. The user may then actuate the fourth input 40 to store the calculated values in the memory element 26 or in an external data storage element accessible through the communications port 18. If the gauge 10 includes the GPS element 30, then the geographical location of the tank may also be stored with the fluid level and/or volume.

Although the invention has been described with reference to the embodiments illustrated in the attached drawing figures, it is noted that equivalents may be employed and substitutions made herein without departing from the scope of the invention as recited in the claims. For example, in embodiments of the present invention, the gauge 10 may include a back-end computer program that allows for tracking of the oil levels in the various tanks measured by the gauge 10, statistical tracking of the levels over a period of time or other parameter, and generation of reports for use in tracking. The data gathered by the gauge 10 may be uploaded, as discussed above, via the communications port 18 and to a computer, system, server, etc. The user may then access the data via the back-end computer program, where the user may aggregate, organize, and track the collected data for the tank volume measurements.

Having thus described various embodiments of the invention, what is claimed as new and desired to be protected by Letters Patent includes the following:

1. A portable hand held tank gauge for measuring a level or a volume of a fluid in a tank, the gauge comprising:
   a housing;
   a signal transceiver operable to transmit a signal to the surface of the fluid and receive the signal reflected from the surface and to generate an output based on the difference in time between transmitting the signal and receiving the signal; and
   a processing element positioned within the housing, the processing element being operable to calculate the level or the volume of the fluid based on the output from the signal transceiver and to receive and to process other tank information in addition to the level or volume of the fluid in the tank, the other tank information including a geographical location of the tank, an identification of the tank, a size of the tank, and prior fluid level measurements.

2. The gauge of claim 1, further including a measurement activator operable to selectively initiate the signal transceiver to transmit the signal.

3. The gauge of claim 1, wherein the signal transceiver includes a laser to transmit the signal and a laser detector to receive the signal.

4. The gauge of claim 1, wherein the adjustable arm includes a flexible shaft with a plurality of links, each link operable to pivot with respect to its adjacent links, the shaft including a proximal end coupled to the housing and a distal end to retain the signal transceiver.

5. The gauge of claim 1, wherein the adjustable arm includes a first segment coupled to the housing, a second segment with an internal telescoping third segment to retain the signal transceiver, and a hinge coupled to the first segment and the second segment, operable to allow the second segment to rotate with respect to the first segment.

6. The gauge of claim 1, further including a display to display the level or the volume of the fluid and the other tank information.

7. The gauge of claim 1, further including a user interface operable to allow the user to enter at least one data entry of the other tank information.

8. The gauge of claim 1, further including a global positioning system element operable to report the geographical location of the tank.

9. A portable hand held tank gauge for measuring a level or a volume of a fluid in a tank, the gauge comprising:
   a housing;
   a signal transceiver operable to transmit a signal to the surface of the fluid and receive the signal reflected from the surface and to generate an output based on the difference in time between transmitting the signal and receiving the signal;
   an adjustable arm coupled to the housing and operable to position the signal transceiver independently from the housing, the adjustable arm including a flexible shaft with a plurality of links, each link operable to pivot with respect to its adjacent links, the shaft including a proximal end coupled to the housing and a distal end to retain the signal transceiver; and a processing element positioned within the housing, the processing element being operable to calculate the level or the volume of the fluid based on the output from the signal transceiver and to receive other tank information in addition to the level or volume of the fluid in the tank, the other tank information including a geographical location of the tank, an identification of the tank, a size of the tank, and prior fluid level measurements.

10. The gauge of claim 9, further including a measurement activator operable to selectively initiate the signal transceiver to transmit the signal.

11. The gauge of claim 9, wherein the signal transceiver includes a laser to transmit the signal and a laser detector to receive the signal.

12. The gauge of claim 9, further including a display to display the level or the volume of the fluid and the other tank information.

13. The gauge of claim 9, further including a user interface operable to allow the user to enter at least one data entry of the other tank information.

14. The gauge of claim 9, further including a global positioning system element operable to report the geographical location of the tank.

15. The portable handheld tank gauge of claim 1, further including a memory element for retaining the level or volume of fluid and the other tank information in a database thereon, the processing element being configured to store the level or volume of the fluid and the other tank information in the database and being configured to retrieve the level or volume of the fluid and the other tank information from the database.

16. The portable handheld tank gauge of claim 1, further including a communications port for transmitting the level or volume of fluid and the other tank information to an external computer having a database thereon for storing the level or volume of fluid and the other tank information in the database and for receiving the other tank information from the database.

17. The portable handheld tank gauge of claim 1, wherein the signal transceiver includes a radio frequency transmitter to transmit the signal, the signal being a radio frequency signal.

18. A portable hand held tank gauge for measuring a level or a volume of a fluid in a tank, the gauge comprising:

a housing;

a signal transceiver operable to transmit a signal to the surface of the fluid and receive the signal reflected from the surface and to generate an output based on the difference in time between transmitting the signal and receiving the signal;

a measurement activator operable to selectively initiate the signal transceiver to transmit the signal;

an adjustable arm coupled to the housing and operable to position the signal transceiver independently from the housing;

a global positioning system element operable to report the geographical location of the tank;

a processing element positioned within the housing, the processing element being operable to calculate the level or the volume of the fluid based on the output from the signal transceiver and to receive and to process other tank information in addition to the level or volume of the fluid in the tank, the other tank information including the geographical location of the tank reported by the global positioning system, an identification of the tank, a size of the tank, and prior fluid level measurements;

a memory element for retaining the level or volume of the fluid and the other tank information in a database thereon, the processing element being configured to store the level or volume of the fluid and the other tank information in the database and being configured to retrieve the level or volume of the fluid and the other tank information from the database;

a display operable to display the level or volume of the fluid and the other tank information; and a user interface operable to allow the user to enter at least one data entry of the other tank information into the portable hand held gauge.

* * * * *